(12) United States Patent
Halstead et al.

(10) Patent No.: US 12,153,689 B2
(45) Date of Patent: Nov. 26, 2024

(54) ENROLLING A VIRTUAL DEVICE AS AN UNPRIVILEGED USER

(71) Applicant: VMware, Inc., Palo Alto, CA (US)

(72) Inventors: Chris Halstead, Nottingham, MD (US); Kevin B. Sheehan, Bloomfield, CT (US); Jared Cook, Bellevue, WA (US); Joshua Spencer, Whitehouse, OH (US)

(73) Assignee: Omnissa, LLC, Mountain View, CA (US)

( * ) Notice: Subject to any disclaimer, the term of this patent is extended or adjusted under 35 U.S.C. 154(b) by 192 days.

(21) Appl. No.: 17/546,160

(22) Filed: Dec. 9, 2021

(65) Prior Publication Data

US 2023/0185929 A1 Jun. 15, 2023

(51) Int. Cl.
| | |
|---|---|
| *G06F 21/60* | (2013.01) |
| *G06F 9/455* | (2018.01) |
| *G06F 21/31* | (2013.01) |

(52) U.S. Cl.
CPC ........ *G06F 21/604* (2013.01); *G06F 9/45558* (2013.01); *G06F 21/31* (2013.01); *G06F 2009/45587* (2013.01); *G06F 2009/45595* (2013.01)

(58) Field of Classification Search
CPC ............ G06F 21/31; G06F 21/604; G06F 2009/45587; G06F 2009/45595; G06F 9/45558
See application file for complete search history.

(56) References Cited

U.S. PATENT DOCUMENTS

| | | | |
|---|---|---|---|
| 8,429,708 B1 * | 4/2013 | Tandon | G06F 21/604 |
| | | | 713/153 |
| 10,715,507 B1 * | 7/2020 | Spears | G06Q 20/405 |
| 2002/0019941 A1 * | 2/2002 | Chan | G06F 21/6218 |
| | | | 713/168 |
| 2016/0170816 A1 * | 6/2016 | Warkentin | G06F 9/544 |
| | | | 719/320 |
| 2017/0111368 A1 * | 4/2017 | Hibbert | H04L 63/102 |
| 2019/0005267 A1 * | 1/2019 | Soman | H04L 63/20 |
| 2019/0028514 A1 * | 1/2019 | Barboi | H04L 63/20 |
| 2019/0205533 A1 * | 7/2019 | Diehl | G06F 21/567 |
| 2021/0400031 A1 * | 12/2021 | Llic | H04L 63/10 |

* cited by examiner

*Primary Examiner* — Daniel B Potratz
*Assistant Examiner* — Matthias Habtegeorgis
(74) *Attorney, Agent, or Firm* — Kim & Stewart LLP (57) ABSTRACT

Examples of enrollment of virtual devices for unprivileged users are described. In some examples, a virtual device includes an enrollment agent, encrypted enrollment credentials, and a user mode privilege elevation component that elevates privilege of the enrollment agent. A privilege elevated token is created to include an administrative privilege of a local security authority service, and a security context of an unprivileged user account logged in to the virtual device. The enrollment agent is launched using the privilege elevated token rather than a user token of a user that is logged in. The enrollment agent decrypts the encrypted enrollment credentials based on administrative privilege of the privilege elevated token, and enrolls the virtual device with a management service using decrypted enrollment credentials.

20 Claims, 4 Drawing Sheets

ENROLLING A VIRTUAL DEVICE AS AN UNPRIVILEGED USER

BACKGROUND

An enterprise can manage access to a suite of applications and enterprise resources can be managed using a management service. The management service can enable administration of management policies, compliance rules, and configuration data which is defined and enforced by the management service. Many different kinds of devices are being used for access to enterprise computing systems and resources. With the growing number of different devices, platforms, and operating systems available for adoption by users, various challenges can arise in the management of the devices. One solution can include provisioning virtual desktops or virtual devices with the various applications and resources for enterprise users. Users can access virtual desktops using a variety of different types of devices. A virtual desktop can also provide a consistent user experience across multiple devices. However, enrolling virtual desktops for management by a management service can pose a number of additional problems. For example, enrollment processes can require administrative privileges, and the end user of the virtual desktop can be associated with an unprivileged user account that lacks administrative privileges. Technologies that provide end users with full administrative privileges, even on a temporary basis, can cause security risks. Technologies that require another user to enroll the device can pose different security risks, and can be time consuming. As a result, there is a need for better enrollment solutions for unprivileged user accounts.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to enrollment of virtual devices for unprivileged users. Many different kinds of devices are being used for access to enterprise computing systems and resources. With the growing number of different devices, platforms, and operating systems available for adoption by users, various challenges can arise in the management of the devices. One solution can include provisioning virtual desktops and other virtual devices with the various applications and resources. Users can access these virtual devices using a variety of different types of physical client devices. A virtual device can also provide a consistent user experience across multiple client devices. However, enrolling virtual devices for management by a management service can pose a number of additional problems. For example, enrollment processes can require administrative privileges, and the end user of the virtual desktop can be associated with an unprivileged user account that lacks administrative privileges. Technologies that provide end users with full administrative privileges, even on a temporary basis, can cause security risks. Technologies that require another user to enroll the device can pose different security risks, and can be time consuming. However, the present disclosure describes mechanisms that can enable secure enrollment of virtual devices for unprivileged users.

Figure 1:
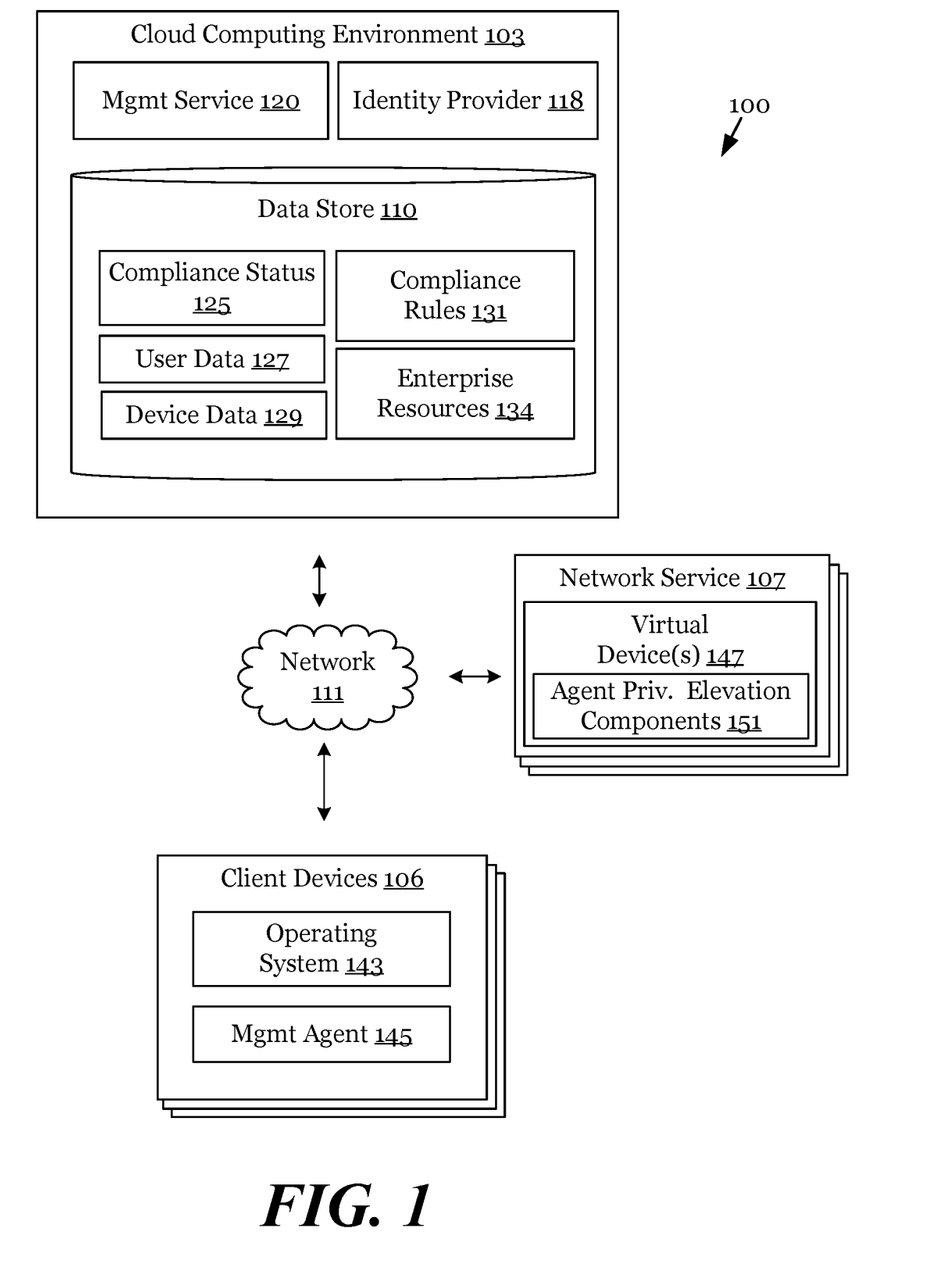
FIG. 1 illustrates an example networked environment that includes components that enroll virtual devices for unprivileged user accounts, according to various examples described herein.

FIG. 1 illustrates an example networked environment 100 that includes components that provide data-at-rest security for managed client devices using an extended set of volume encryption data. The networked environment 100 can include a cloud computing environment 103, several client devices 106, and virtualization services 107 in communication through a network 111. The components of the networked environment 100 can enable secure enrollment of virtual devices for unprivileged users.

The cloud computing environment 103 can be embodied as one or more computers, computing devices, or computing systems. In certain embodiments, the cloud computing environment 103 can include one or more computing devices arranged, for example, in one or more server or computer banks. The computing device or devices can be located at a single installation site or distributed among different geographical locations. The cloud computing environment 103 can include a plurality of computing devices that together embody a hosted computing resource, a grid computing resource, or another distributed computing arrangement. In some cases, the cloud computing environment 103 can be embodied as an elastic computing resource where an allotted capacity of processing, network, storage, or other computing-related resources vary over time. As further described below, the cloud computing environment 103 can also be embodied, in part, as certain functional or logical (e.g., computer-readable instructions) elements or modules as described herein.

The cloud computing environment 103 can operate as an environment for mobile device management and a unified endpoint management (UEM) platform that can manage the client devices 106, fixed drives, and other devices and endpoints. In that context, the cloud computing environment 103 includes a data store 110. The cloud computing environment 103 can also execute a management service 120 and an identity provider 118, among other processes. The data store 110 includes areas in memory for the storage of compliance statuses 125, user data 127, device data 129, compliance rules 131, and enterprise resources 134, among other types of data. A compliance status 125, a set of device data 129, and a set of compliance rules 131 can be maintained for each client device 106 and each virtual device 147. The management service 120 can operate as a UEM platform that can manage client devices 106, virtual devices 147, and other endpoints that are enrolled as managed physical and virtual devices with the management service 120.

The network 111 can include the Internet, intranets, extranets, wide area networks (WANs), local area networks (LANs), wired networks, wireless networks, cable networks, satellite networks, other suitable networks, or any combinations thereof. As one example, the cloud computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the cloud computing environment 103, the virtualization service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The identity provider 118 can provide single sign-on or identity management capabilities for an enterprise. The identity provider 118 can allow users to authenticate his or her identity to obtain an authentication token that can be provided to a virtualization service 107. The identity provider 118 can utilize OAuth, security assertion mark-up language (SAML), or other single sign-on methodologies. The identity provider 118 and management service 120 can communicate so that the management service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The management service 120 can transmit compliance rules 131, including security baselines, policies, profiles, and configuration data for execution by and/or enforcement on the client device 106. Security baselines, policies, profiles, and configuration data can also be enforced for virtual devices 147 accessed using a client device 106. In that context, during or after enrollment of a virtual device 147 or a client device 106, the management service 120 can retrieve or generate a set of management policies, compliance rules 131, and other configuration data and transfer those policies, rules, and data for enforcement by a management agent 145 or other management instructions executed by a client device 106 or a virtual device 147.

The management service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices, according to organizational or other factors or considerations. The management service 120 can ensure compliance of the virtual devices 147 and client devices 106 in conjunction with the management agent 145 and other instructions executed by the cloud computing environment 103, the virtual device 147, and the client device 106.

The client devices 106 are representative of one or more client devices 106. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communication devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the management service 120 for device management. A management agent 145 can be installed on a client device 106 to locally manage the device on behalf of the remotely executed management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

User data 127 represents information about users who have user accounts in the enterprise. These users can have one or more client devices 106 that are enrolled as managed devices with the management service 120. These users can utilize enrolled and unenrolled client devices 106 to access virtual devices 147 that can provide access to enterprise resources 134. User data 127 can include authentication data, and information about user accounts with the management service 120, accounts with an enterprise domain, and other accounts. The account status as an unprivileged account or a privileged account can also be indicated.

The device data 129 can include device records for devices including client devices 106 and virtual devices 147. The device record can include information about each device. For example, the device record can indicate a user account, a group identifier, and organization identifier, which can indicate a user, department, and enterprise associated with the device.

Each device record can also include a device serial number, a management universally unique identifier (UUID), and a management unique device identifier (UDID). The management UUID can be a UUID that is created during the enrollment process. The management UDID can be a UDID that is created during the enrollment process. Generally, the management UUID and the management UDID can each be used as unique identifiers assigned to a client device 106 or a virtual device 147 upon enrollment. The device record can include one or both of these identifiers among various embodiments.

The management UUID can include a 128-bit integer, or another format. The management UDID can include a hash of the serial number, or can be generated using an algorithm that does not take the serial number as an input. The serial number for a client device 106 can be assigned by the manufacturer or device provider. However, the serial number for a virtual device 147 can be assigned by the virtualization service 107.

The management UUID and the management UDID can be assigned to a client device 106 or a virtual device 147 by the management service 120 at enrollment time, upon account creation, or another time. If an enrollment request from a client device 106 or a virtual device 147 is received along with an existing management UUID or management UDID, then the device record will be updated rather than creating a new device record with a new management UUID and management UDID.

The device data 129 can also include a mapping that maps compliance rules 131 to a user account, as well as to client devices 106 and virtual devices 147. The device data 129 can also identify user data 127 such as one or more users or user accounts that are associated with a particular client device 106 or virtual device 147. The device data 129 can also reference or include the compliance status 125 for a particular client device 106 or virtual device 147.

Once a client device 106 or virtual device 147 is enrolled for device management by the management service 120, the management service 120 can direct the installation of various software components or applications on the client device 106. The software components can be configured on the client device 106 at the direction of the management service 120. Such software components can include, for example, applications, resources, libraries, and other related components.

The virtualization services 107 can be embodied as one or more computers, computing devices, or computing systems. Like the cloud computing environment 103, the virtualization service 107 can include one or more computing devices arranged, for example, in one or more server or computer banks. The computing device or devices can be located at a single installation site or distributed among different geographical locations. The virtualization service 107 can include a plurality of computing devices that together embody a hosted computing resource, a grid computing resource, or other distributed computing arrangement. The virtualization service 107 can also be embodied, in part, as certain functional or logical (e.g., computer-readable instructions) elements or modules as described herein.

The virtualization services 107 can include first party and third party services provided by an enterprise to its users. The virtualization services 107 can also be provided using the cloud computing environment 103 of the management service 120, and can include first party and third party services with respect to the management service 120. A virtualization service 107 can include a service that provides virtual desktops in a virtual desktop infrastructure (VDI) virtualization solution, remote desktops in a remote desktop session hosts (RDSH) virtualization solution, and other virtual devices 147 that can be accessed using client devices 106. The management service 120 can manage access to the virtual devices 147. The virtual devices 147 can include virtual desktops, remote desktops, virtual application services, and other types of virtual devices 147.

The virtual devices 147 can be launched as a clone such as a full clone, linked clone, or instant clone based on a virtual machine golden image or another parent virtual machine. The virtual device 147 can include a persistent or a non-persistent virtual device 147. The virtual device 147 can be launched from a powered-on virtual machine or a powered-off virtual machine image. The parent virtual machine can be configured using a console user interface of a virtualization service 107 or the management service 120. This can include a user interface through which the agent privilege elevation components 151 and agent privilege elevation rules can be specified.

A full clone virtual device 147 can include a fully independent child virtual machine that has virtual disks and memory that operate separately from, and share no system resources with, the parent virtual machine after the cloning operation. A linked clone virtual device 147 can include a child virtual machine that shares virtual disks with the parent virtual machine in an ongoing manner. A linked clone virtual device 147 can be made from a snapshot of the parent virtual machine and can use snapshot-based delta disks. A delta disk represents the difference between the current state of the virtual disk and the state that existed at the time that the previous snapshot was taken. The child disks employ a copy-on-write (COW) mechanism, in which the virtual disk contains no data in places until copied there by a write. This optimization can conserve storage space.

An instant clone virtual device 147 can be a child virtual machine that shares virtual disks and memory with the parent virtual machine in an ongoing manner. Like the linked clone virtual device 147, an instant clone virtual device 147 also can be made from a snapshot of the parent virtual machine and can use snapshot-based delta disks. An instant clone virtual device 147 also shares the memory state of the parent virtual machine to deliver efficient memory use. Instant clone virtual devices 147 can be created in a powered-on state with the virtual machine ready for users to connect, and can include the guest applications of the parent virtual machine prior to provisioning and with a memory state indicated in the snapshot along with the virtual disk state.

Instant clone virtual devices 147 can include mode A virtual devices 147 and mode B virtual devices 147. Mode A instant clone virtual devices 147 can be created from a running virtual machine instead of a powered-off virtual machine, and can function much like a container. Mode B instant clone virtual devices 147 can be created from a powered-off virtual machine image, and can lack a running parent virtual machine.

A virtual device 147 can include an operating system 143, a management agent 145, as well as a suite of applications. The virtual device 147 can be provided using a virtual machine, a container, or another type of virtual device. The virtual device 147 can be executed using one or more physical host devices that provide hardware resources. The virtual devices 147 can have access to enterprise resources 134 specified according to the compliance rules 131. Enterprise resources 134 can include applications, databases, scripts, directories, files, and other resources that are used to perform enterprise activities.

The virtual device 147 can also include or be associated with agent privilege elevation components 151 including agent privilege elevation rules and executable privilege elevation programs. The agent privilege elevation components 151 can indicate and enable privilege elevation for applications specified according to folder name and path, file name and path, file hash, as well as files signed with a certificate from a particular publisher or certificate authority. The privilege elevation can cause the specified files to be executed with elevated or administrative privilege while having the security context of a logged-in non-administrative or unprivileged user account. The elevated privilege can be provided a privilege associated with a local security authority subsystem service or process of an operating system of the virtual device 147.

Figure 2:
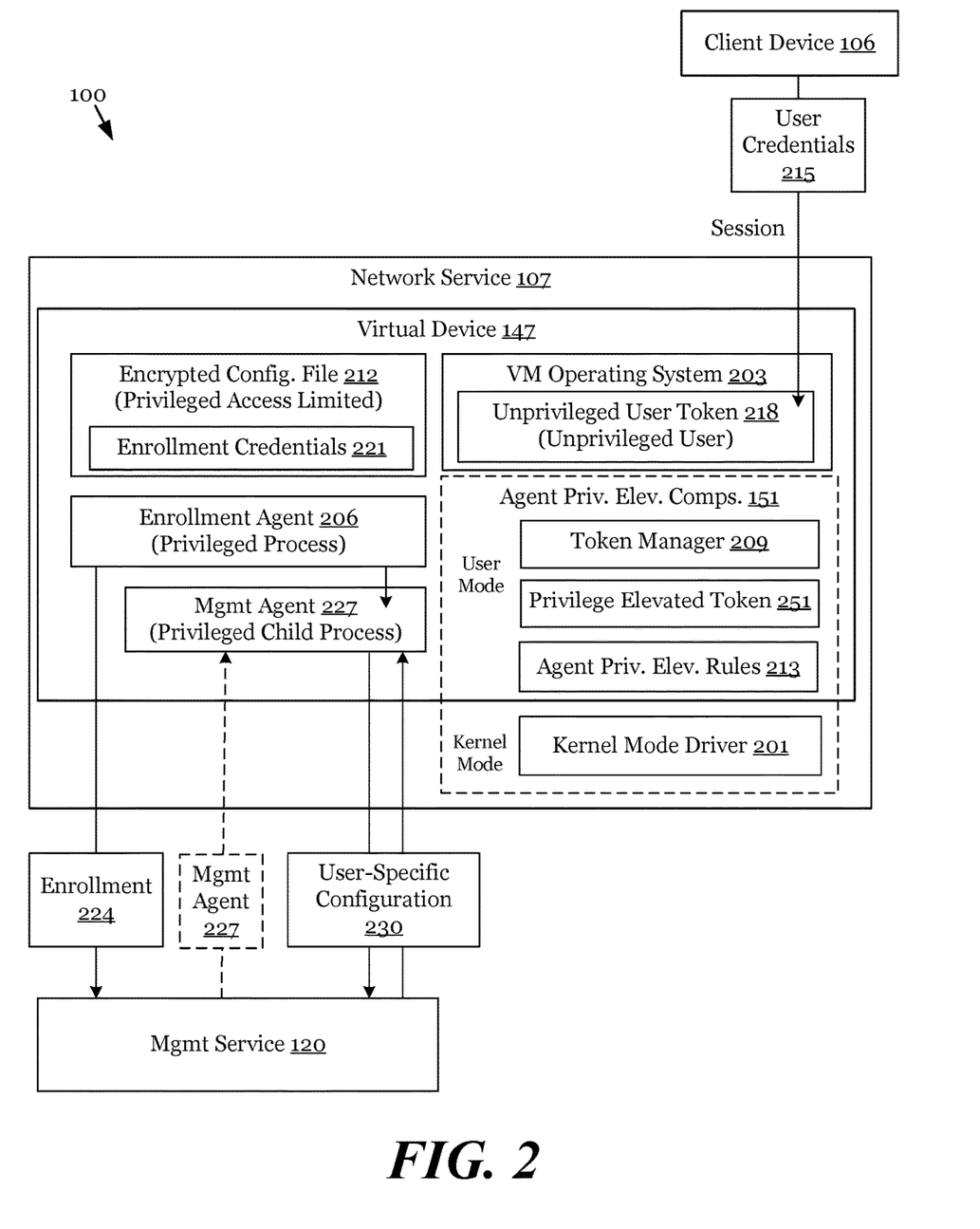
FIG. 2 illustrates an enrollment process using the components of the networked environment of FIG. 1, according to various examples described herein.

FIG. 2 outlines an example of enrolling a virtual device 147 for an unprivileged user account using the components of the networked environment 100. In this example, the virtualization service 107 includes the virtual device 147 and a kernel mode driver 201 executed using a host computing device that provides hardware resources for the virtual device 147. The virtual device 147 can include a virtual machine operating system 203, an enrollment agent 206, an encrypted configuration file 212, as well as agent privilege elevation components 151 including a token manager 209, and agent privilege elevation rules 213. The virtual device 147 can also include, or download, a management agent 227. The agent privilege elevation components 151 can also include a kernel mode driver 201 that communicates and works in concert with the user mode components including the token manager 209.

The virtual machine operating system 203 can include a WINDOWS® operating system such as WINDOWS® 10, WINDOWS® 11, or another operating system. The virtual machine operating system 203 can include an operating system that is the same as, or different from, the operating system 143 of the client device 106.

The enrollment agent 206 can include an executable component that enrolls the virtual device 147 with the management service 120 for management. The enrollment agent 206 can be an executable process that fails unless it is executed as a privileged process. The token manager 209 can create a privilege elevated token 251 that can be used to execute the enrollment agent 206 as a privileged process. The privilege elevated token 251 can be created by using a privileged token of a local security authority subsystem service or process, and specifying a logged-in non-administrative or unprivileged user account. The enrollment agent 206 in some examples can include an application wrapper that wraps the management agent 227.

The encrypted configuration file 212 can include encrypted configuration data for the virtual device 147. The encrypted configuration data can include enrollment credentials 221 that authenticate an enrollment request 224 to enroll the virtual device 147 with the management service 120. The agent privilege elevation rules 213 can specify that the enrollment agent 206 and the management agent 227 are to be executed as privileged processes. Additionally or alternatively, the agent privilege elevation rules 213 can specify that the enrollment agent 206 and all child processes of the enrollment agent 206 are to be executed as privileged processes. The agent privilege elevation rules 213 can specify the enrollment agent 206 to be executed as privileged processes according to its folder name and path, file name and path, file hash, or a certificate used to sign an enrollment agent 206 file.

The encrypted configuration file 212 can include configuration data that is encrypted with the RsaProtectedConfigurationProvider in .NET, or another cryptographic tool. This eliminates the issue of content being shown in clear text for end users, which can be a security risk. When logged in with a console session of the virtualization service 107, an administrator can interact with user interface elements corresponding to "Protect Configuration" and "Unprotect Configuration" to manage the encrypted configuration file 212. This will encrypt and decrypt the configuration file, if the user is logged in through the console session rather than through a VDI session or another session of the virtualization service 107. The administrator can make changes and updates to the information in the file, and re-encrypt the file. The system can then be converted to a full clone template that can be used to launch a full clone, or take a snapshot that can be used to launch an instant clone. On logon, the enrollment agent 206 can start up, and verify that it is running inside a VDI or RDSH, or other session of the virtualization service 107. The enrollment agent 206 can also have administrative privileges to decrypt the encrypted configuration file 212 using RsaProtectedConfigurationProvider in .NET, or another cryptographic tool.

The configuration data can include the enrollment credentials 221, as well as an endpoint address or identifier for the management service 120, staging users, and other information. The enrollment credentials 221 can include the staging users, an API key, a password, and additional information that can be used to authenticate communications with the endpoint specified in the encrypted configuration file. Examples of the enrollment credentials 221 can include credentials to log into the management service 120, which are associated with the authority to enroll and register devices. The enrollment credentials 221 can further include Base64 Encoded Username:Password or another type of username and password that can be added to authorization header when making API calls to the management service 120 for enrollment. In some cases, the enrollment credentials 221 can be communications credentials for communications between the enrollment agent 206 and the management service 120, as well as communications between the management agent 227 and the management service 120.

Generally, the agent privilege elevation components 151 can be executed during an initial startup or out-of-box experience of a newly launched virtual device 147. The agent privilege elevation components 151 can include user mode and kernel mode processes. For example, the kernel mode driver 201 can be a kernel mode or kernel space process that is modified to include privilege elevation instructions. The other agent privilege elevation components 151 can be user mode or user space processes.

A user can log in and provide user credentials 215 when accessing the virtual device 147. In some cases, the user credentials 215 can be manually entered into a login user interface of the virtual device 147, and in other examples the user credentials 215 can be obtained based on a user logging in to the operating system 143.

The token manager 209 can retrieve a privileged security authority service token of the local security authority subsystem service of the virtual machine operating system 203. The token manager 209 can then launch an environment configuration process to create the privilege elevated token 251, using the privileged security authority service token and a unprivileged user token 218 associated with the local session. The privilege of the privilege elevated token 251 can be an administrative privileged status matching that of the privileged security authority service token, while identifying a user account and security context of the unprivileged user token 218.

Executing the enrollment agent 206 as part of the startup of the virtual device 147 can ensure that the virtual device 147 is enrolled for management by the management service 120. The enrollment agent 206 of the virtual device 147 can require a privileged status generally associated with privileged user accounts. For example, the enrollment agent 206 of the virtual device 147 can require a privileged status to access and decrypt the encrypted configuration file 212 to retrieve the enrollment credentials 221. However, the user credentials 215 provided to the virtual machine operating system 203 at startup can be associated with an unprivileged or non-administrative user account.

The token manager 209 can transmit the agent privilege elevation rules 213, including instructions to intercept a launch of the enrollment agent 206. The kernel mode driver 201 can detect and intercept a launch of the enrollment agent 206 according to the agent privilege elevation rules 213. The kernel mode driver 201 can transmit the process identifier or PID of the partially-created enrollment agent 206 to the token manager 209.

The token manager 209 can change the primary token of the partially-created enrollment agent 206 from the unprivileged user token 218 to the privilege elevated token 251. The token manager 209 can then transmit an indication to continue process creation of the enrollment agent 206 with the privilege elevated token 251. The enrollment agent 206 is then executed as a privilege elevated process with the privilege of the privileged security authority service token and a security context and user identifier of an unprivileged user account.

The enrollment agent 206 can then decrypt the encrypted configuration file 212 based on the administrative privilege status, retrieve the enrollment credentials 221, and transmit an enrollment request 224 to the management service 120. The enrollment agent 206 can have access to a decryption key or decryption tool based on the administrative privilege, and can use the decryption key or decryption tool to decrypt the encrypted configuration file 212. The enrollment request 224 can be authenticated using the enrollment credentials 221. While the enrollment agent 206 can decrypt the encrypted configuration file 212, the unprivileged user of the virtual device 147 is prevented from accessing and prevented from decrypting the encrypted configuration file 212.

The management service 120 can register the virtual device 147 in association with the unprivileged user account. In some examples, the management service 120 can transmit the management agent 227 to the enrollment agent 206 for installation and execution on the virtual device 147. In other examples, the management agent 227 can already be stored in a virtual disk or datastore of the virtual device 147. The enrollment agent 206 can then execute the management agent 227 as a privileged child process of the enrollment agent 206. Since the management agent 227 is a child process of the enrollment agent 206, it can be executed using the same privilege elevated token 251 used for the enrollment agent 206.

The management agent 227 can check in with the management service 120, and retrieve a command from the command queue. The command can include one or more commands to download and apply a user-specific configuration 230. The user-specific configuration 230 can include compliance rules 131, and can specify access to a subset of the enterprise resources 134 based on the compliance status 125 of the virtual device 147 and the client device 106 through which it is accessed. The compliance rules 131, and enterprise resources 134 can further be identified based on the unprivileged user account.

Figure 3:
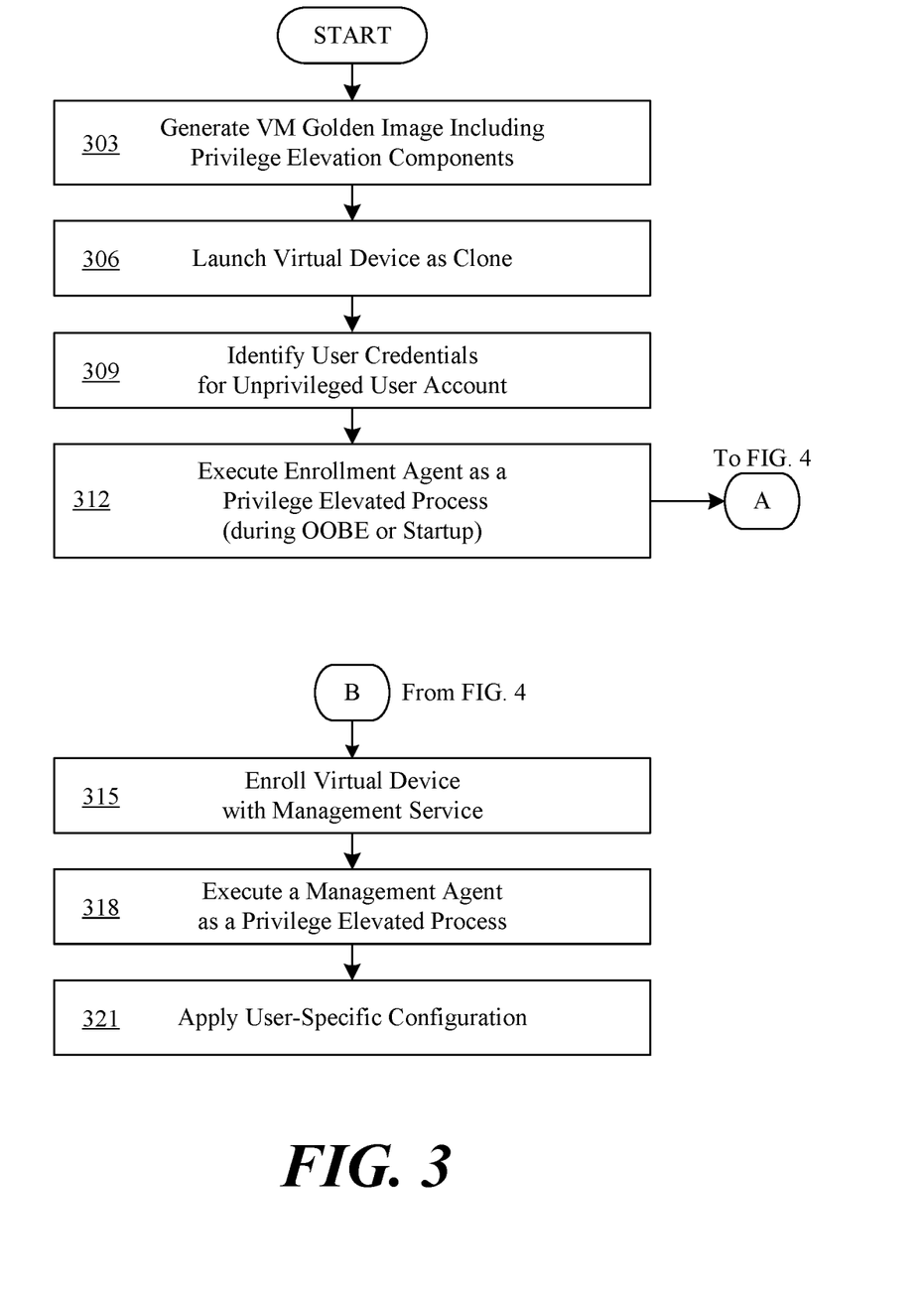
FIG. 3 illustrates a flowchart performed by components of the networked environment to enroll virtual devices for unprivileged user accounts, according to various examples described herein.

FIG. 3 shows a flowchart performed by components of the networked environment 100. The flowchart shows how the components of the networked environment 100 work in concert to configure and launch a virtual device 147 or virtual machine with agent privilege elevation components 151 that elevate the privilege of an enrollment agent 206. The actions can be discussed as actions executed by the virtualization service 107, such as a virtual desktop service or another virtualization service used in conjunction with the management service 120. While the steps can be discussed as being performed by the virtualization service 107, other components of the networked environment 100 can also perform certain aspects of the flowchart.

In step 303, the virtualization service 107 can generate a virtual machine golden image that includes agent privilege elevation components 151. This virtual machine golden image can be configured using a console user interface of a virtualization service 107. This can include a user interface through which the agent privilege elevation components 151 and agent privilege elevation rules 213 can be specified. The virtualization service 107 can configure the virtual device 147 to include the enrollment agent 206, the token manager 209, the encrypted configuration file 212, including the enrollment credentials 221, and agent privilege elevation rules 213. The agent privilege elevation rules 213 can indicate to elevate the privilege of the enrollment agent 206 and all child processes. Additionally or alternatively, the agent privilege elevation rules 213 can indicate to elevate the privilege of the management agent 227. If the management agent 227 is not a child process of the enrollment agent 206, then the privilege elevation process can be applied to the management agent 227 in a manner similar to that discussed for the enrollment agent 206.

In step 306, the virtualization service 107 can launch the virtual device 147 as a clone of the virtual machine golden image. This can include launching the virtual device 147 as a clone of a powered-on virtual machine based on the virtual machine golden image, or from a powered-off virtual machine golden image. The virtual device 147 can include a persistent or non-persistent clone virtual machine that is to be registered or enrolled in association with a single user account and security context.

The virtual device 147 can be launched as a clone such as a full clone or a linked clone based on the virtual machine golden image. A full clone virtual device 147 can include a fully independent child virtual machine that has virtual disks and memory that operate separately from, and share no system resources with, the parent virtual machine after the cloning operation. A linked clone virtual device 147 can include a child virtual machine that shares virtual disks with the parent virtual machine in an ongoing manner.

In step 309, the virtualization service 107 can receive user credentials for an unprivileged user account. The virtualization service 107 can execute the virtual device 147, which identifies a username and password entered through a login user interface. These credentials can be associated with an unprivileged user account. The agent privilege elevation components 151 determine that privilege elevation should be performed for the enrollment agent 206 and the management agent 227 based on the unprivileged user account being identified using the user credentials. The agent privilege elevation components 151 determine that privilege elevation should be performed for the enrollment agent 206 and the management agent 227 based on the unprivileged user account being identified using the user credentials.

In step 312, the virtualization service 107 can execute the enrollment agent 206 as a privilege elevated process. This can indicate that the enrollment agent 206 is executed with a privilege of a privileged security authority service token of a local service authority subsystem service, while identifying the unprivileged user account and security context. This process is described in further detail in FIG. 4.

In step 315, the virtualization service 107 can enroll the virtual device 147 with the management service 120. Once the enrollment agent 206 is executed as a privilege elevated process, the enrollment agent 206 can access and decrypt the encrypted configuration file 212. In other words, the enrollment agent 206 can decrypt the enrollment credentials 221. While the enrollment agent 206 can decrypt the encrypted configuration file 212, the unprivileged user of the virtual device 147 is prevented from accessing and prevented from decrypting the encrypted configuration file 212. The enrollment agent 206 can transmit an enrollment request that includes the enrollment credentials 221. The enrollment request can be authenticated using the enrollment credentials 221.

The management service 120 can receive the request and register the virtual device 147 with the user account. In some examples, the management service 120 can transmit the management agent 227 to the enrollment agent 206 for installation and execution on the virtual device 147. In other examples, the management agent 227 can already be stored in a virtual disk or datastore of the virtual device 147.

In step 318, the virtualization service 107 can execute the management agent 227 as a privileged child process of the enrollment agent 206. Since the management agent 227 is a child process of the enrollment agent 206, it can be executed using the same privilege elevated token 251 used for the enrollment agent 206. Alternatively, the management agent 227 can be executed as a privilege elevated process based on a process similar to that described for the enrollment agent 206.

In step 321, the virtualization service 107 can apply a user-specific configuration to the virtual device 147. The management agent 227 can check in with the management service 120, and can retrieve a command from the command queue. The command can include one or more commands to download and apply a user-specific configuration 230. The user-specific configuration 230 can include compliance rules 131, and can specify access to a subset of the enterprise resources 134 based on the compliance status 125 of the virtual device 147 and the client device 106 through which it is accessed. The compliance rules 131, and enterprise resources 134 can further be identified based on the unprivileged user account.

Figure 4:
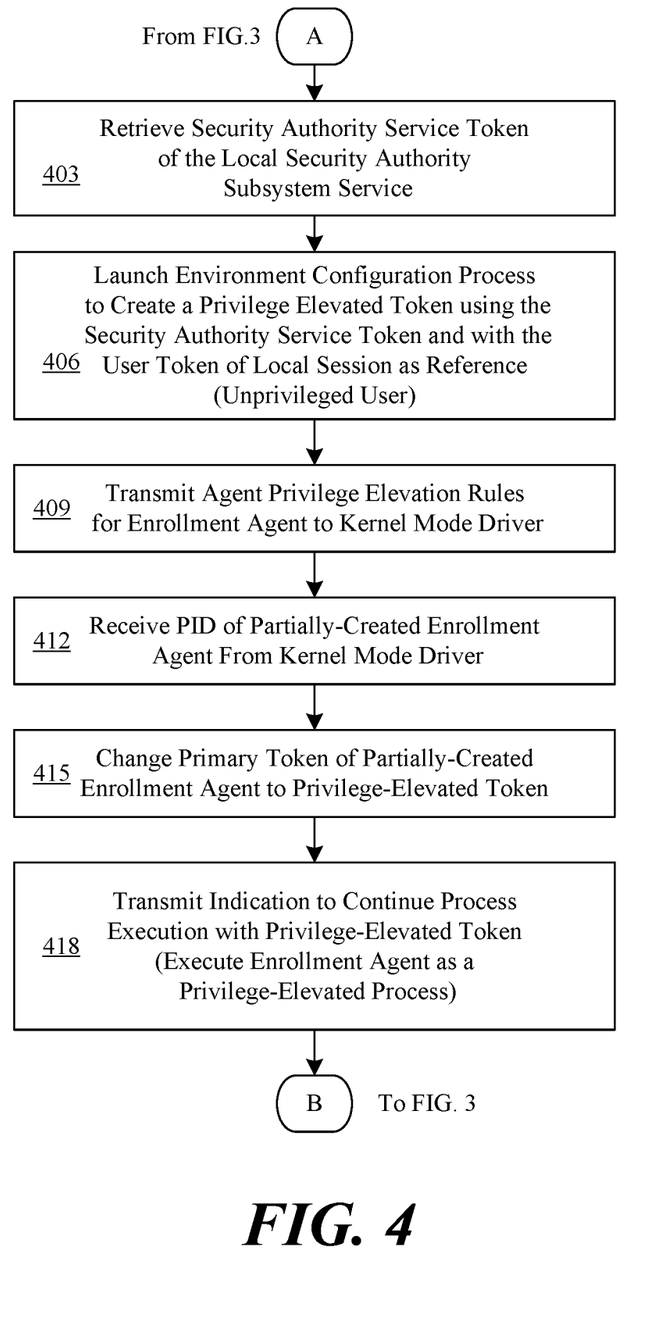
FIG. 4 illustrates another flowchart performed by components of the networked environment to enroll virtual devices for unprivileged user accounts, according to various examples described herein.

FIG. 4 shows a flowchart performed by components of the networked environment 100. Generally, the flowchart shows how the token manager 209 of the agent privilege elevation components 151 guides elevation of the privilege of an enrollment agent 206. While the steps can be discussed as being performed by the token manager 209, other components of the agent privilege elevation components 151 and the networked environment 100 more broadly can also perform certain aspects of the flowchart.

In step 403, the token manager 209 can retrieve a privileged security authority service token of a local security authority subsystem service of the virtual device 147. The token manager 209 can retrieve the privileged security authority service token using token management Application Programming Interfaces (APIs) provided by the virtual machine operating system 203. The token manager 209 can store this privileged security authority service token. To create a new token, the token manager 209 needs token creation privilege (e.g., "SE_CREATE_TOKEN_NAME" privilege) that is provided using the local security authority subsystem service. In some cases, this privilege is limited to only the local security authority subsystem service.

In step 406, the token manager 209 can launch an environment configuration process to create a privilege elevated token 251. The privilege elevated token 251 can be created using the privileged security authority service token and a unprivileged user token 218 associated with a local login session as a reference. The unprivileged user token 218 can identify or otherwise be associated with an unprivileged user account.

When a user logs in to the virtual device 147, the token manager 209 can use a token creation command line option (e.g., "CreateElevatedToken") to launch an environment configuration process. The token manager 209 can also pass the process identifier of the token manager 209 and a session identifier of a login session of the virtual device 147. This can cause the environment configuration process to create a privilege elevated token 251. The environment configuration process can be executed using the privileged security authority service token, which can provide token creation privilege. In some examples, token creation privilege is disabled, and is first enabled so the environment configuration process can create the privilege elevated token 251.

The environment configuration process can retrieve the unprivileged user token 218 of the local login session using a windows terminal service (WTS) API or another API of the virtual machine operating system 203. The environment configuration process can create the privilege elevated token 251 with the unprivileged user token 218 and the privileged security authority service token as references. The environment configuration process can create the special token using a token creation API of the virtual machine operating system 203. The privilege elevated token 251 can include the security context and other properties including owner, user, session identifier, access control list (e.g., discretionary access control list (DACL)) and additional security context information from the unprivileged user token 218, while having additional privileges of the privileged security authority service token. This can include BuildIN\Administrator privilege or another administrative privilege.

The privilege elevated token 251 can be a primary token and has a new session identifier as TokenSessionId. If a normal user launches environment configuration process with option "CreateElevatedToken," it will fail since the unprivileged user will not have the create token privilege. However, the environment configuration process is launched using the privileged security authority service token, which includes this privilege. The environment configuration process can then duplicate a token handle of the privilege elevated token 251 to the token manager 209, based on its process identifier. The environment configuration process can terminate itself with an exit code providing the duplicated token handle of the privilege elevated token 251.

The token manager 209 can be waiting for the environment configuration process to terminate, and can retrieve its exit code, which is the duplicated token handle of the privilege elevated token 251. The token manager 209 can maintain a list, table, or another data structure of privilege elevated tokens 251 for certain processes such as the enrollment agent 206 and the management agent 227. The data structure can use a session identifier as a key to entry.

In step 409, the token manager 209 can transmit the agent privilege elevation rules 213 to the kernel mode driver 201. The agent privilege elevation rules 213 can instruct the kernel mode driver 201 to intercept a launch of the enrollment agent 206, and in some cases additional processes such as the management agent 227.

In step 412, the token manager 209 can receive a process identifier of a partially-created enrollment agent 206. The partially-created enrollment agent 206 is not running or executed, but the process identifier is created. The kernel mode driver 201 can intercept the launch of the enrollment agent 206, identify its process identifier, and transmit it to the token manager 209.

In step 415, the token manager 209 can change the primary token of the partially-created enrollment agent 206 from the unprivileged user token 218 to the privilege elevated token 251. the token manager 209 can get the session identifier for the process identifier of the partially-created enrollment agent 206, and then retrieve the corresponding privilege elevated token 251 from the table, using the session identifier as a key. The primary token can be process specific and a duplicate of the privilege elevated token 251 is created for each process creation. Using the session identifier as a key can enable support for multi-user environments. Multiple token managers 209 can have access to the privilege elevated token list or table.

In step 418, the token manager 209 can then transmit an indication to continue process creation of the enrollment agent 206 with the privilege elevated token 251. The enrollment agent 206 is then executed as a privilege elevated process with the privilege of the privileged security authority service token and a security context and user identifier of the logged in unprivileged user account. At least a portion of the security context and user identifier can be identified using the unprivileged user token 218.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The cloud computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:
launching, by a virtualization service, a virtual device comprising: an enrollment agent, encrypted enrollment credentials, at least one user mode privilege elevation component that elevates privilege of the enrollment agent, and an operating system;
creating, by the at least one user mode privilege elevation component, a privilege elevated token comprising: an administrative privilege of a local security authority service, and a security context of an unprivileged user account logged in to the virtual device from a client device that is managed by a device management system;
changing, by the at least one user mode privilege elevation component, a primary token of the enrollment agent from a user token to the privilege elevated token; and
executing, by the virtual device, the enrollment agent using the privilege elevated token, wherein the enrollment agent: decrypts the encrypted enrollment credentials based on the administrative privilege of the privilege elevated token, and transmits an enrollment request that includes the decrypted enrollment credentials to a management service of the device management system to enroll the virtual device with the management service using the decrypted enrollment credentials.

2. The method according to claim 1, wherein the virtual device comprises a plurality of agent privilege elevation components that includes at least one kernel mode privilege elevation component and the at least one user mode privilege elevation component.

3. The method according to claim 2, further comprising:
intercepting, by the at least one kernel mode privilege elevation component, a launch of the enrollment agent; and
transmitting, by the at least one kernel mode privilege elevation component to the at least one user mode privilege elevation component, a process identifier of the enrollment agent prior to execution of the enrollment agent.

4. The method according to claim 3, further comprising:
transmitting, from the at least one user mode privilege elevation component to the at least one kernel mode privilege elevation component, an indication to continue with process execution of the enrollment agent once the primary token of the enrollment agent is changed from the user token to the privilege elevated token.

5. The method according to claim 1, wherein the privilege elevated token is created using: an unprivileged user token associated with the unprivileged user account, and a privileged token of the local security authority service.

6. The method according to claim 1, further comprising:
executing, by the virtual device, a management agent as a child process of the enrollment agent, wherein the management agent uses the privilege elevated token based on being the child process of the enrollment agent.

7. The method according to claim 1, wherein the virtual device is a virtual desktop infrastructure (VDI)-based virtual desktop.

8. A non-transitory computer-readable medium embodying instructions executable by at least one computing device, the instructions, when executed, causing the at least one computing device to at least:
launch, by a virtualization service, a virtual device comprising: an enrollment agent, encrypted enrollment credentials, at least one user mode privilege elevation component that elevates privilege of the enrollment agent, and an operating system;
create, by the at least one user mode privilege elevation component, a privilege elevated token comprising: an administrative privilege of a local security authority service, and a security context of an unprivileged user account logged in to the virtual device from a client device that is managed by a device management system;
change, by the at least one user mode privilege elevation component, a primary token of the enrollment agent from a user token to the privilege elevated token; and
execute, by the virtual device, the enrollment agent using the privilege elevated token, wherein the enrollment agent: decrypts the encrypted enrollment credentials based on the administrative privilege of the privilege elevated token, and transmits an enrollment request that includes the decrypted enrollment credentials to a management service of the device management system to enroll the virtual device with the management service using the decrypted enrollment credentials.

9. The non-transitory computer-readable medium according to claim 8, wherein the virtual device comprises a plurality of agent privilege elevation components that includes at least one kernel mode privilege elevation component and the at least one user mode privilege elevation component.

10. The non-transitory computer-readable medium according to claim 9, wherein the instructions, when executed, cause the at least one computing device to at least:
intercept, by the at least one kernel mode privilege elevation component, a launch of the enrollment agent; and
transmit, by the at least one kernel mode privilege elevation component to the at least one user mode privilege elevation component, a process identifier of the enrollment agent prior to execution of the enrollment agent.

11. The non-transitory computer-readable medium according to claim 10, wherein the instructions, when executed, cause the at least one computing device to at least:
transmit, from the at least one user mode privilege elevation component to the at least one kernel mode privilege elevation component, an indication to continue with process execution of the enrollment agent once the primary token of the enrollment agent is changed from the user token to the privilege elevated token.

12. The non-transitory computer-readable medium according to claim 8, wherein the privilege elevated token is created using: an unprivileged user token associated with the unprivileged user account, and a privileged token of the local security authority service.

13. The non-transitory computer-readable medium according to claim 8, wherein the instructions, when executed, cause the at least one computing device to at least:
execute, by the virtual device, a management agent as a child process of the enrollment agent, wherein the management agent uses the privilege elevated token based on being the child process of the enrollment agent.

14. The non-transitory computer-readable medium according to claim 8, wherein the virtual device is a virtual desktop infrastructure (VDI)-based virtual desktop.

15. A system, comprising:
at least one computing device; and
instructions accessible by the at least one computing device, wherein the instructions, when executed, cause the at least one computing device to at least:
launch, by a virtualization service, a virtual device comprising: an enrollment agent, encrypted enrollment credentials, at least one user mode privilege elevation component that elevates privilege of the enrollment agent, and an operating system;
create, by the at least one user mode privilege elevation component, a privilege elevated token comprising: an administrative privilege of a local security authority service, and a security context of an unprivileged user account logged in to the virtual device from a client device that is managed by a device management system;
change, by the at least one user mode privilege elevation component, a primary token of the enrollment agent from a user token to the privilege elevated token; and
execute, by the virtual device, the enrollment agent using the privilege elevated token, wherein the enrollment agent: decrypts the encrypted enrollment credentials based on the administrative privilege of the privilege elevated token, and transmits an enrollment request that includes the decrypted enrollment credentials to a management service of the device management system to enroll the virtual device with the management service using the decrypted enrollment credentials.

16. The system according to claim 15, wherein the virtual device comprises a plurality of agent privilege elevation components that includes at least one kernel mode privilege elevation component and the at least one user mode privilege elevation component.

17. The system according to claim 16, wherein the instructions, when executed, cause the at least one computing device to at least:
intercept, by the at least one kernel mode privilege elevation component, a launch of the enrollment agent; and
transmit, by the at least one kernel mode privilege elevation component to the at least one user mode privilege elevation component, a process identifier of the enrollment agent prior to execution of the enrollment agent.

18. The system according to claim 17, wherein the instructions, when executed, cause the at least one computing device to at least:
transmit, from the at least one user mode privilege elevation component to the at least one kernel mode privilege elevation component, an indication to continue with process execution of the enrollment agent once the primary token of the enrollment agent is changed from the user token to the privilege elevated token.

19. The system according to claim 15, wherein the privilege elevated token is created using: an unprivileged user token associated with the unprivileged user account, and a privileged token of the local security authority service.

20. The system according to claim 15, wherein the instructions, when executed, cause the at least one computing device to at least:
execute, by the virtual device, a management agent as a child process of the enrollment agent, wherein the management agent uses the privilege elevated token based on being the child process of the enrollment agent.

* * * * *